US012699451B2

(12) United States Patent
Wang et al.

(10) Patent No.: US 12,699,451 B2
(45) Date of Patent: Aug. 4, 2026

(54) MUSIC RECOMMENDATION BASED ON WEARABLE DEVICES

(71) Applicant: Anhui Huami Health Technology Co., Ltd., Heifei (CN)

(72) Inventors: Kongqiao Wang, Heifei (CN); Yi Yu, Heifei (CN); Guokang Zhu, Heifei (CN); Cong Zhang, Heifei (CN); Zi Meng, Heifei (CN)

(73) Assignee: Anhui Huami Health Technology Co., Ltd., Hefei (CN)

( * ) Notice: Subject to any disclaimer, the term of this patent is extended or adjusted under 35 U.S.C. 154(b) by 259 days.

(21) Appl. No.: 18/422,440

(22) Filed: Jan. 25, 2024

(65) Prior Publication Data

US 2024/0192775 A1 Jun. 13, 2024

Related U.S. Application Data

(63) Continuation of application No. PCT/CN2022/092080, filed on May 10, 2022.

(30) Foreign Application Priority Data

Sep. 10, 2021 (CN) .......................... 202111062501.9

(51) Int. Cl.
*G06F 3/01* (2006.01)
*G10H 1/00* (2006.01)

(52) U.S. Cl.
CPC ........... *G06F 3/015* (2013.01); *G10H 1/0008* (2013.01); *G06F 2203/011* (2013.01); *G10H 2210/036* (2013.01)

(58) Field of Classification Search
None
See application file for complete search history.

(56) References Cited

U.S. PATENT DOCUMENTS 9,978,358 B2 * 5/2018 Morishima .......... A61B 5/4812
10,409,546 B2 * 9/2019 Zalon ........................ G06F 3/16
(Continued)

FOREIGN PATENT DOCUMENTS

| CN | 101120412 A | 2/2008 |
| CN | 107423352 A | 12/2017 |

(Continued)

OTHER PUBLICATIONS

International Search Report and English translation for International Application No. PCT/CN2022/092080 dated Jun. 21, 2022.
(Continued)

*Primary Examiner* — Hemant S Patel
(74) *Attorney, Agent, or Firm* — Young Basile Hanlon & MacFarlane, P.C.

(57) ABSTRACT

Provided are a method, apparatus, computer device, and storage medium for music recommendation based on a wearable device, and relates to the field of computer technologies. The method for music recommendation includes: obtaining one or more physiological parameters of a target user collected by the wearable device; inputting the one or more physiological parameters of the target user into a trained relaxation state assessment model to determine a current relaxation state of the target user; and determining at least one piece of target recommendation music based on at least one of the current relaxation state of the target user or relaxation parameters corresponding to multiple pieces of music to be recommended, wherein the at least one piece of target recommendation music is configured to be played for the target user.

19 Claims, 5 Drawing Sheets

(56)  References Cited

U.S. PATENT DOCUMENTS

2015/0297109 A1* 10/2015 Garten ..................... A61B 5/38
                                                                  600/28
2018/0314959 A1    11/2018 Apokatanidis et al.

FOREIGN PATENT DOCUMENTS

| CN | 107515925 A | 12/2017 |
| CN | 107997751 A | 5/2018 |
| CN | 108543193 A | 9/2018 |
| CN | 109119057 A | 1/2019 |
| CN | 110772700 A | 2/2020 |
| CN | 112121283 A | 12/2020 |
| CN | 112435641 A | 3/2021 |
| CN | 112541093 A | 3/2021 |

OTHER PUBLICATIONS

Deger, Ayata; Emotion Based Music Recommendation System Using Wearable Physiological Sensors; IEEE Transactions on Consumer Electronics, vol. 64, No. 02, May 31, 2018 (May 31, 2018), ISSN: 1558-412.

* cited by examiner

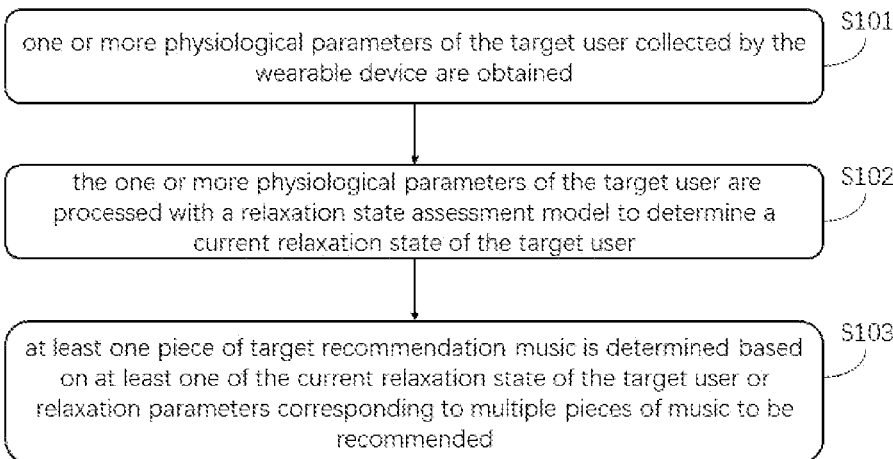

S101 one or more physiological parameters of the target user collected by the wearable device are obtained

S102 the one or more physiological parameters of the target user are processed with a relaxation state assessment model to determine a current relaxation state of the target user

S103 at least one piece of target recommendation music is determined based on at least one of the current relaxation state of the target user or relaxation parameters corresponding to multiple pieces of music to be recommended

FIG. 1

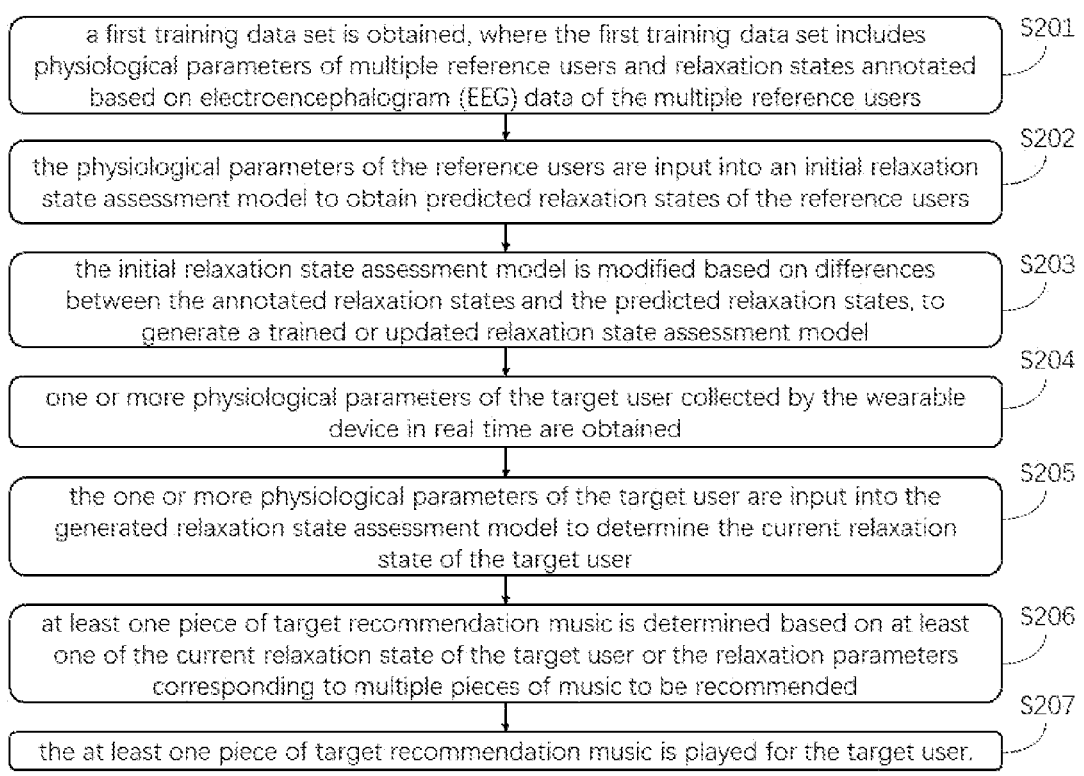

a first training data set is obtained, where the first training data set includes physiological parameters of multiple reference users and relaxation states annotated based on electroencephalogram (EEG) data of the multiple reference users    S201 the physiological parameters of the reference users are input into an initial relaxation state assessment model to obtain predicted relaxation states of the reference users    S202 the initial relaxation state assessment model is modified based on differences between the annotated relaxation states and the predicted relaxation states, to generate a trained or updated relaxation state assessment model    S203 one or more physiological parameters of the target user collected by the wearable device in real time are obtained    S204 the one or more physiological parameters of the target user are input into the generated relaxation state assessment model to determine the current relaxation state of the target user    S205 at least one piece of target recommendation music is determined based on at least one of the current relaxation state of the target user or the relaxation parameters corresponding to multiple pieces of music to be recommended    S206 the at least one piece of target recommendation music is played for the target user.    S207

FIG. 2

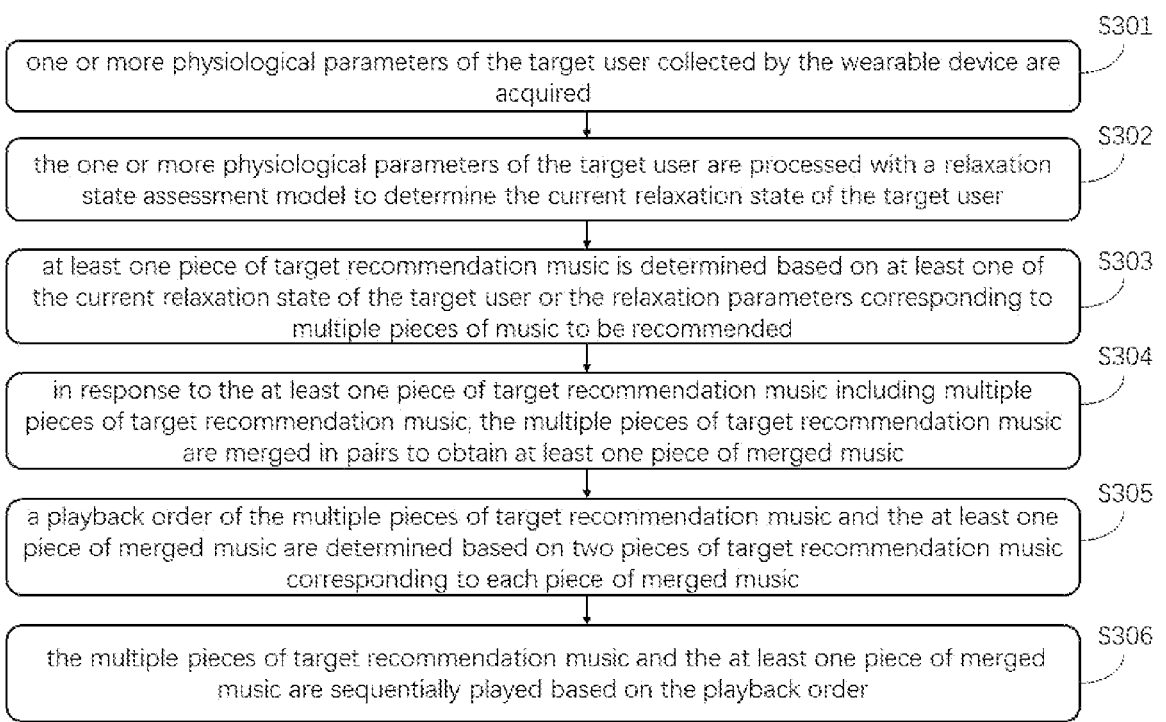

S301 one or more physiological parameters of the target user collected by the wearable device are acquired

S302 the one or more physiological parameters of the target user are processed with a relaxation state assessment model to determine the current relaxation state of the target user

S303 at least one piece of target recommendation music is determined based on at least one of the current relaxation state of the target user or the relaxation parameters corresponding to multiple pieces of music to be recommended

S304 in response to the at least one piece of target recommendation music including multiple pieces of target recommendation music, the multiple pieces of target recommendation music are merged in pairs to obtain at least one piece of merged music

S305 a playback order of the multiple pieces of target recommendation music and the at least one piece of merged music are determined based on two pieces of target recommendation music corresponding to each piece of merged music

S306 the multiple pieces of target recommendation music and the at least one piece of merged music are sequentially played based on the playback order

FIG. 3

MUSIC RECOMMENDATION BASED ON WEARABLE DEVICES

CROSS-REFERENCE TO RELATED APPLICATION(S)

The present application is a continuation of International Application No. PCT/CN2022/092080, filed on May 10, 2022, which claims priority and benefit of Chinese Patent Application No. 202111062501.9, filed Sep. 10, 2021, the entire disclosures of both of which are hereby incorporated by reference.

TECHNICAL FIELD

The present disclosure relates to the field of computer technologies, and in particular to methods, apparatuses, devices, and storage medium for music recommendation based on wearable devices.

BACKGROUND

Roughly one-third of human life is spent in sleep, and the quality of sleep is a crucial factor affecting human productivity, daily life, and physical and mental health. Sleep-related issues are also receiving increasing attention in the field of public health. Music therapy, as a simple and practical non-pharmacological approach, has been proven to have a significant impact on addressing insomnia problems.

Traditional methods for recommending sleep aid music rely on user's interactive behavior or subjective preference choices, which introduce subjective uncertainties. For example, merely playing songs from a playlist in a repetitive manner does not guarantee a direct connection between the playback order and its effectiveness in sleep aid. Therefore, how to achieve accurate personalized recommendations for sleep aid music is a major technological challenge.

SUMMARY

This disclosure provides methods, apparatuses, devices, and storage medium for music recommendation based on wearable devices.

According to one aspect of this disclosure, a method for music recommendation based on a wearable device is provided, including:

obtaining one or more physiological parameters of a target user collected by the wearable device;

processing the one or more physiological parameters of the target user with a relaxation state assessment model to determine a current relaxation state of the target user; and determining at least one piece of target recommendation music based on at least one of the current relaxation state of the target user or relaxation parameters corresponding to multiple pieces of music to be recommended, wherein the at least one piece of target recommendation music is configured to be played for the target user.

In some implementations, determining at least one piece of target recommendation music based on at least one of the current relaxation state of the target user or relaxation parameters corresponding to multiple pieces of music to be recommended includes:

ranking the multiple pieces of music to be recommended in a descending order based on the relaxation parameters corresponding to the multiple pieces of music to be recommended; and determining at least one piece of target recommendation music from the ranked multiple pieces of music to be recommended according to the ranking of the multiple pieces of music to be recommended.

In some implementations, the top N pieces of music to be recommended in the ranked multiple pieces of music to be recommended are determined as the target recommendation music, where N is a number equal to or greater than 1.

In some implementations, determining at least one piece of target recommendation music based on at least one of the current relaxation state of the target user or relaxation parameters corresponding to multiple pieces of music to be recommended includes:

obtaining at least one previous relaxation state of the target user; and determining at least one target recommendation music based at least in part on a comparison of the current relaxation state and the at least one previous relaxation state of the target user.

In some implementations, in response to determining that the target user is more relaxed, the at least one piece of target recommendation music is determined based at least in part on a piece of music currently being played for the target user.

In some implementations, in response to determining that the target user is not more relaxed, the at least one piece of target recommendation music is determined based on the relaxation parameters corresponding to the multiple pieces of music to be recommended.

For instance, if the target user is more relaxed, one or more pieces of music currently being played for the target user can be continued to be played for the target user. Alternatively, at least one piece of music with at least one music characteristics same as that of one or more pieces of music currently being played for the target user can be determined to be the target recommendation music.

In some implementations, wherein the determining at least one piece of target recommendation music based on at least one of the current relaxation state of the target user or relaxation parameters corresponding to multiple pieces of music to be recommended includes:

responsive to the current relaxation state of the target user indicating that the target user being relaxed or being more relaxed, determining, by starting from the beginning, a first quantity of target recommendation music from the ranked multiple pieces of music to be recommended; and responsive to the current relaxation state of the target user indicating the target user not being relaxed or not being more relaxed, determining, by starting from the beginning, a second quantity of target recommendation music from the ranked multiple pieces of music to be recommended;

wherein the second quantity is greater than the first quantity.

In some implementations, the one or more physiological parameters of the target user are inputted into the relaxation state assessment model for processing, and the relaxation state assessment model outputs information indicating the current relaxation state of the target user.

In some implementations, the relaxation state assessment model is generated with a first training data set, wherein the first training data set includes physiological parameters of multiple reference users and relaxation states annotated based on EEG data of the multiple reference users.

In some implementations, before determining at least one piece of target recommendation music based on at least one of the current relaxation state of the target user or relaxation parameters corresponding to multiple pieces of music to be recommended, the method further includes:

obtaining at least one of music preferences, attribute information, or historical sleep data of the target user;

determining the target music style corresponding to the target user based on at least one of the music preferences, the attribute information, or the historical sleep data of the target user; and obtaining multiple pieces of candidate music belonging to the target music style from a candidate music library as the multiple pieces of music to be recommended.

In some implementations, multiple pieces of candidate music in the candidate music library belong to multiple music styles, a relaxation parameter of each of the multiple music styles for the target user is determined. Then, the target music style is determined based on the relaxation parameters of the multiple music styles. For example, a music style with a biggest value of relaxation parameter or a value greater than a predefined threshold is determined to be the target music style.

In some implementations, in addition to the at least one of music preferences, attribute information, or historical sleep data of the target user, one or more of information about music, such as music playback popularity or the like, can be obtained and used to determine the relaxation parameters of the music styles or to determine the target music style.

In some implementations, other information about the target user, such as initial relaxation state of the target user, the current relaxation state of the target user, the historical music playback data of the target user and/or the like, can be obtained and used to determine the relaxation parameters of the music styles or to determine the target music style.

In some implementations, before determining at least one piece of target recommendation music based on at least one of the current relaxation state of the target user or relaxation parameters corresponding to multiple pieces of music to be recommended, the method further includes:

obtaining music features of multiple pieces of music to be recommended; and determining the relaxation parameters corresponding to the multiple pieces of music to be recommended with a relaxation parameter estimation model based on the music features of multiple pieces of music to be recommended and at least one of attribute information of the target user or historical music playback data of the target user.

In some implementations, the music characteristics of multiple pieces of music to be recommended as well as at least one of the attribute information of the target user or historical music playback data of the target user is input into the relaxation parameter estimation model to determine relaxation parameters corresponding to multiple pieces of music to be recommended.

In some implementations, the relaxation parameter estimation model is generated with a second training data set, wherein the second training data set includes first relaxation curves obtained during playback of multiple pieces of reference music for multiple reference users and second relaxation curves obtained during the multiple pieces of reference music not being played for the multiple reference users.

In some implementations, the at least one piece of target recommendation music is one piece of target recommendation music. In this case, the method further includes: merging the target recommendation music with a piece of music currently being played for the target user to obtain a piece of merged music, wherein the merged music is played for the target user before playing the target recommendation music.

In some implementations, the at least one piece of target recommendation music is multiple pieces of target recommendation music, and playback of the at least one piece of target recommendation music includes:

merging the multiple pieces of target recommendation music pairwise to obtain at least one piece of merged music;

determining a playback order of the multiple pieces of target recommendation music and the at least one piece of merged music based on two pieces of target recommendation music corresponding to each merged music;

wherein the multiple pieces of target recommendation music and the at least one piece of merged music are played for the target user in sequence based on the playback order.

In some implementations, merging the multiple pieces of target recommendation music pairwise to obtain at least one piece of merged music includes:

determining, based on the relaxation parameters of the multiple pieces of target recommendation music, at least one pair of target recommendation music from the multiple pieces of target recommendation music, where each pair of target recommendation music comprises two pieces of adjacent target recommendation music; and merging the two pieces of adjacent target recommendation music to obtain the merged music;

wherein the merged music is played for the target user between corresponding two pieces of adjacent target recommendation music.

In some implementations, merging the multiple pieces of target recommendation music pairwise to obtain at least one piece of merged music includes:

extracting, starting from the end, a first music segment of a preset duration from the previous of two pieces of target recommendation music in each pair of target recommendation music;

extracting, starting from the beginning, a second music segment of a preset duration from the latter of two pieces of target recommendation music in the pair of target recommendation music; and merging the first music segment and the second music segment to obtain merged music.

In some implementations, merging the first music segment and the second music segment to obtain merged music includes:

merging, based on a first weight sequence and a second weight sequence, respective sub-segments of the first music segment and of the second music segment to generate a plurality pieces of merged music;

wherein the first weight sequence and the second weight sequence respectively include a plurality of weight values, a plurality of first weight values in the first weight sequence gradually decrease, a plurality of second weight values in the second weight sequence gradually increase, and the sum of each first weight value with a corresponding second weight value is 1.

According to a second aspect of the present disclosure, an apparatus for music recommendation based on a wearable device is provided, comprising:

an acquisition module for obtaining one or more physiological parameters of a target user collected by the wearable device;

a first determination module for processing the one or more physiological parameters of the target user with a relaxation state assessment model to determine a current relaxation state of the target user;

a second determination module for determining at least one piece of target recommendation music based on at least one of the current relaxation state of the target user or relaxation parameters corresponding to multiple pieces of music to be recommended, wherein the at least one piece of target recommendation music is configured to be played for the target user.

According to a third aspect of the present disclosure, an electronic device is provided, comprising:

at least one processor; and a memory communicatively connected to said at least one processor; wherein, the memory stores instructions executable by said at least one processor, and execution of the instructions by the at least one processor enables the at least one processor to execute the method according to any one of the implementations of the first aspect of the present disclosure.

According to a fourth aspect of the present disclosure, a non-transitory computer-readable storage medium storing computer instructions is provided. The computer instructions is configured to cause a computer to execute the method according to any one of the implementations of the first aspect of the present disclosure.

According to a fifth aspect of the present disclosure, a computer program product is provided, comprising a computer program that, when executed by a processor, implements the method according to any one of the implementations of the first aspect of the present disclosure.

In some implementations of the present disclosure, the apparatus first obtains one or more physiological parameters of the target user collected by the wearable device. The one or more physiological parameters of the target user are input into a trained relaxation state assessment model to determine the current relaxation state of the target user. Based on at least one of the current relaxation state of the target user or relaxation parameters corresponding to multiple pieces of music to be recommended, at least one piece of target recommendation music is determined, which is then played for the target user. Therefore, by wearing the wearable device by the target user, the relaxation state of the target user can be assessed in real-time, and moreover, by taking into account the portability of the wearable device and the fitting capability of machine learning techniques, the method can provide accurate and effective relaxing music for the target user.

Furthermore, in some implementations, the apparatus first obtains a first training data set, wherein the first training data set includes physiological parameters of multiple reference users and relaxation states annotated based on EEG data of the multiple reference users. The physiological parameters of the reference users are input into an initial relaxation state assessment model to obtain their predicted relaxation states. Subsequently, the initial relaxation state assessment model is adjusted based on the difference between annotated and predicted relaxation states to generate a trained relaxation state assessment model. The one or more physiological parameters of the target user collected by the wearable device are then obtained and input into the trained relaxation state assessment model to determine the current relaxation state of the target user. Based on the current relaxation state and relaxation parameters corresponding to multiple pieces of music to be recommended, at least one piece of target recommendation music is determined for playback to the target user. This approach utilizes reference users to create a training data set and adjust the relaxation state assessment model, leading to a more accurate determination of relaxation state of the target user, thus providing more accurate and effective relaxing music for the target user.

Moreover, in some implementations, the apparatus first obtains one or more physiological parameters of the target user collected by the wearable device. The one or more physiological parameters are input into a trained relaxation state assessment model to determine the current relaxation state of the target user. Based on the current relaxation state and relaxation parameters corresponding to multiple pieces of music to be recommended, multiple pieces of target recommendation music are determined. Subsequently, the multiple pieces of target recommendation music are fused pairwise to obtain multiple pieces of fused music. The playback order of the multiple pieces of target recommendation music and fused music is determined based on two pieces of target recommendation music corresponding to each fused music. Finally, the multiple pieces of target recommendation music and fused music are played sequentially. This approach allows for the provision of personalized relaxation music to different target users while avoiding being bored with a monotonous music library, and providing seamless music transitions, ultimately delivering more accurate and effective relaxing music for the target user.

It should be understood that the content described in this section is not intended to identify key or essential features of the implementations of the present disclosure, nor is it intended to limit the scope of the present disclosure. Other features of the present disclosure will become readily understood from the following description.

BRIEF DESCRIPTION OF THE DRAWINGS

The accompanying drawings are provided for a better understanding of the present disclosure and do not constitute a limitation on the disclosure.

FIG. 1 is a schematic flow chart of an example method for music recommendation based on wearable devices;

FIG. 2 is a schematic flowchart of another example method for music recommendation based on wearable devices;

FIG. 3 is a schematic flowchart of yet another example method for music recommendation based on wearable devices;

DETAILED DESCRIPTION

Figure 4:
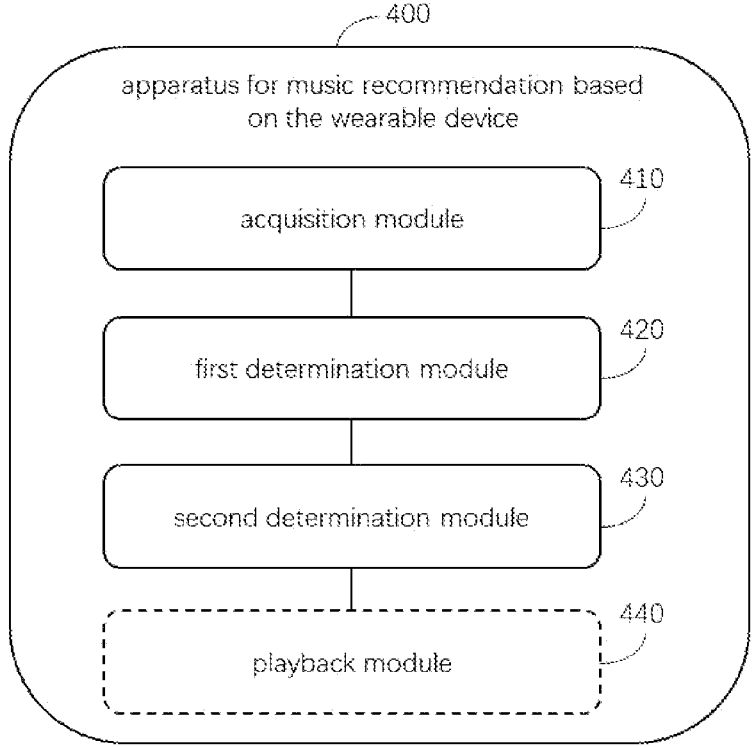
FIG. 4 is a structural block diagram of an example apparatus for music recommendation based on wearable devices.

The following example implementations of the present disclosure are described in conjunction with the accompanying drawings, in which various details of the implementations are provided herein to facilitate understanding and should be considered to be examples only. Therefore, those skilled in the art should recognize that various changes and modifications can be made to the implementations described herein. Similarly, descriptions of well-known functions and structures are omitted in the following for clarity and conciseness.

The method for music recommendation based on wearable devices proposed in the present disclosure can be executed by the apparatus for music recommendation based on wearable devices provided in the present disclosure, or can be executed by the electronic device provided in the present disclosure, wherein the electronic device can include, but is not limited to, terminal devices such as desktop computers and tablet computers, and the electronic device can also be a server. The following description will be made with reference to the apparatus for generating sleep aid music provided in the present disclosure, referred to hereinafter as "the apparatus", to execute the method for music recommendation based on wearable devices provided in the present disclosure, without limiting the scope of the present disclosure.

The method, apparatus, computer device and storage medium for music recommendation based on the wearable device provided in the present disclosure are described in detail with reference to the accompanying drawings below.

FIG. 1 is a schematic flowchart of a method for music recommendation based on the wearable device according to some implementations of the present disclosure. As shown in FIG. 1, the method for music recommendation based on the wearable device in this implementation includes the following procedures S101 to S103.

At S101, one or more physiological parameters of the target user collected by the wearable device are obtained.

The wearable device can be worn by the target user, making contact with or pressing against the skin of the target user through sensors to obtain the one or more physiological parameters of the target user. The wearable device can include at least one sensor to obtain current physiological parameters of the target user, such as, for example, a heart rate sensor such as a PPG sensor, an ECG sensor, a motion sensor, a blood pressure sensor, a respiratory sensor and/or the like.

The one or more physiological parameters of the target user can include a heart rate, a respiratory rate, a heart rate variability, a respiratory rate variability, a skin impedance, a blood pressure, a blood oxygen, sleep stages, and/or the like.

The physiological parameters of the target user can serve as indicators for evaluation of a relaxation state of the target user. For example, in medical research, a person's heart rate typically decreases when being relaxed. Based on this prior knowledge, a significant decrease in heart rate can be considered as an indication of the person being in a more relaxed state.

At S102, the one or more physiological parameters of the target user are processed with a relaxation state assessment model to determine a current relaxation state of the target user.

The music recommendation for stress relief and sleep aid relies on an accurate assessment of the physical relaxation state of the target user. Therefore, after obtaining the physiological parameter data of the target user in real-time, the apparatus needs to process the physiological parameter data with a model to estimate the current relaxation state of the target user. In one example, the physiological parameter data is input into a pre-trained relaxation state assessment model to estimate the current relaxation state of the target user. Alternatively, the physiological parameter is pre-processed and then input into the relaxation state assessment model for processing. The relaxation state assessment model can be implemented as software, hardware, or firmware of the apparatus, e.g., electronic device 500 of FIG. 5. Part or all of the relaxation state assessment model can also be implemented by another device or a server.

The relaxation state assessment model outputs information indicates the current relaxation state of the target model, and the apparatus can use the relaxation state assessment model to generate corresponding label for the relaxation state of the target user. In one example, the relaxation state assessment model outputs an indicator indicating the relaxation state of the target user, such as "relaxed," "somewhat relaxed," "not relaxed," or "tense". In another example, the relaxation state assessment model outputs a relaxation score, where a higher relaxation score indicates the target user being more relaxed or more tense.

At S103, at least one piece of target recommendation music is determined based on at least one of the current relaxation state of the target user or relaxation parameters corresponding to multiple pieces of music to be recommended.

The target recommendation music can be music that assists the target user in relax and sleep while taking the characteristics of the target user into consideration.

In some implementations, the apparatus can proceed in various manners for determining at least one piece of target recommendation music based on at least one of the current relaxation state of the target user or the relaxation parameters corresponding to multiple pieces of music to be recommended.

The multiple pieces of music to be recommended have corresponding relaxation parameters, where the magnitude of the relaxation parameter represents the relaxation efficacy of the music to be recommended. For example, if the relaxation parameter is directly proportional to the relaxation efficacy of the music to be recommended, a larger relaxation parameter indicates a higher relaxation efficacy of the music to be recommended, indicating that the music to be recommended is more conducive in helping the target user to relax and relieve stress, and more conducive in sleep aid. Additionally, in some implementations, a same piece of music can have different relaxation parameters for different users, and the relaxation parameters corresponding to the multiples pieces to be recommended can indicate the relaxation efficacies of the multiple pieces of music to be recommended for the target user.

In some implementations, the at least one piece of target recommendation music is determined based on respective relaxation parameters of the multiple pieces of music to be recommended. For example, if there are M pieces of music to be recommended, a bigger relaxation parameter indicates a higher relaxation efficacy, and the M pieces of music to be recommended are arranged in a descending order of their relaxation parameters as E1, E2, . . . , EM, then the apparatus can select k pieces of music from the beginning of the arranged M pieces of music to be recommended, so as for recommendation to the target user, where k is a number equal to or greater than 1, and can be pre-defined according to actual needs. For another example, the apparatus can select k pieces of music randomly according to the relaxation parameters, and take the k selected pieces of music as the target recommendation music, where a piece of music to be recommended with a relaxation parameter indicating a higher relaxation efficacy has a bigger probability to be selected. In this case, the target recommendation music is determined from the multiple pieces of music to be recommended in a weight-based random selection manner, where the relaxation parameters are taken as the weights of the multiple pieces of music to be recommended.

In some implementations, the at least one piece of target recommendation music is determined based on the current relaxation state of the target user. In one example, the number of the at least one piece of target recommendation music can be determined according to the current relaxation state of the target user, and being in a more relaxed state can result in a fewer number of the at least one piece of the target recommendation music.

In some implementations, the at least one piece of target recommendation music is determined based on the current relaxation state of the target user and the relaxation parameters of the multiple pieces of music to be recommended. Optionally, a value of k, which is the number of the at least one piece of target recommendation music, is determined according to the current relaxation state of the target user, and the k pieces of target recommendation music is selected according to the relaxation parameters of the multiple pieces of music to be recommended. For instance, if M pieces of music to be recommended are arranged in a descending order of the relaxation parameters, and the current state of the target user is "relaxed", or if a value of the current state of the target user is more than a first preset threshold for the target user, the apparatus can select the first M/4 pieces of music as the target recommendation music for recommendation to the target user. For another instance, if the current state of the target user is "not relaxed", or if a value of the current state of the target user is less than a second preset threshold for the target user, the apparatus can select the first 3M/4 pieces of music as the target recommendation music for recommendation to the target user.

In some implementations, the current relaxation state of the target user relies at least in part on the music that has been or is currently being played for the target user, so the current relaxation state of the target user can be used to evaluate the relaxation effect of the music has been or currently being played for the target user, and the apparatus can determine the at least one piece of target recommendation music according to the relaxation effect of at least piece of music which has been recommended to the target user. In an example, a change of relaxation state of the target user is determined according to the current relaxation state and at least one previous relaxation state, and the at least one piece of target recommendation music is determined according to the change of the relaxation state of the target user. For instance, if it is determined that the target user is becoming more relaxed, the music currently being and/or just has been played for the target user is determined to be the target recommendation music. In this case, no new music is going to be played for the target user. For another instance, if it is determined that the target user is not becoming more relaxed, such as becomes more tense or does not have a significant change, at least one piece of music with a higher relaxation parameter from music other than those currently being or just has been played for the target user is determined to the target recommendation music.

In some implementations, the multiple pieces of music to be recommend can be grouped based on their music characteristics, such as music style, pitch, rhythm or chord, etc. In this way, based on the change of the relaxation state of the target user, at least one piece of music belonging to a same or different group as the music that has been or is currently being played for the target user is determined to be the target recommendation music. For example, if the target user becomes more relaxed, at least one piece of music belonging to a same group as the music that has been or is being played for the target user is determined to be the target recommendation music. For another example, if the target user does not become more relaxed, at least one piece of music belonging to a different group is determined to be the target recommendation music.

After the at least one piece of the target recommendation music is determined, the at least one piece of target recommendation music is provided to the target user. The apparatus can play the at least one piece of target recommendation music for the target user. Alternatively, the apparatus can send the at least one piece of target recommendation music to a playback device, such that the playback device can play the at least one target recommendation music for the target user.

In some implementations, music recommendation can be performed in response to receiving a user command for playing relaxation music or in response to other trigger conditions being met. In some other implementations, music recommendation can be performed in a fixed-length time window periodically, wherein the length of the time window can be a duration of one or more pieces of music segments. In either way, one or more pieces of target recommendation music can be determined in one music recommendation. For instance, one piece of target recommendation music is determined in a time window. In this case, the one or more physiological parameters of the target user can be obtained during or after the playback of a previous piece of music, i.e., a target recommendation music determined in the previous time window and currently being played for the target user, and after playback of the previous piece of music, the determined target recommendation music at the current time window can be directly played for the target user, or, the determined target recommendation music and the previous piece of music can be merged to obtain a merged music, and the target recommendation music is played for the target user after the merged music. For another instance, multiple pieces of the target recommendation music are determined in a time window. In this case, one or more physiological parameters of the target user can be obtained during or after the playback of one or more pieces of music determined in the previous time window. The first of multiple pieces of target recommendation music can optionally be merged with the last piece of music in the last time window, and the adjacent target recommendation music can be optionally merged to obtain at least one merged music.

In some implementations, the apparatus can play the target recommendation music to the target user with a playback device mounted on the apparatus. Alternatively, the apparatus can play the target recommendation music to the target user with a playback device wirelessly communicated to the apparatus. In this case, the apparatus sends the at least one piece of the target recommendation music to the playback device, and the playback device plays the target recommendation music to the target user. It can be understood that, while playing the target recommendation music, the apparatus can also continuously collect one or more physiological parameters of the target user in real-time through the wearable device, allowing for dynamic adjustment of one or more relaxation parameters of the music later on.

In this implementation, the apparatus first obtains one or more physiological parameters of the target user collected by the wearable device, processes the one or more physiological parameters of the target user with the relaxation state assessment model to determine the current relaxation state of the target user. Then, based on at least one the current relaxation state of the target user or the relaxation parameters corresponding to multiple pieces of music to be recommended, at least one piece of target recommendation music is determined to be played for the target user. Therefore, by wearing a wearable device by the target user, the relaxation state can be assessed in real time, and the method balances the portability of wearable devices with the adaptability of machine learning techniques, providing accurate and effective relaxation-inducing music for the target user.

FIG. 2 depicts a flowchart of another implementation of the method for music recommendation based on the wearable device according to the present disclosure.

As shown in FIG. 2, the method for music recommendation based on the wearable device can include the following procedures S201 to S207. In this example, the relaxation state assessment model is generated by the apparatus. In other examples, the relaxation state assessment model can be generated by another device.

At S201, a first training data set is obtained, where the first training data set includes physiological parameters of multiple reference users and relaxation states annotated based on electroencephalogram (EEG) data of the multiple reference users.

The first training data set can be collected from the reference users. In some examples, the reference users can include any user whose data is available. Alternatively, users can be grouped based at least in part on the attribute information, music preferences, etc., and the reference users can belong to a same user group as the target user. In this way, rather than training a universal model for all of the users, different user groups can correspond to different relaxation state assessment models, thereby providing a more customized relaxation state assessment model for the target user.

By wearing wearable devices by the reference users, the apparatus can collect physiological parameter data from the reference users in real time via the wearable devices, where the physiological parameters include the heart rate, the respiratory rate, the skin impedance, the blood pressure, the blood oxygen, and/or the like.

Additionally, the apparatus can also collect EEG data corresponding to each reference user with the wearable device or an EEG acquisition device. In some implementations, EEG data can be obtained by placing an EEG collection device on a person's scalp to detect brain wave signals, and then collecting and processing EEG wave data by any suitable processing means, such as the processor in the EEG collection device, or the processor in the apparatus.

Since EEG data is a relatively direct and accurate measure of a person's relaxation state, the annotated relaxation states of each reference user are determined based on the EEG data of the reference user, resulting in a more accurate relaxation state assessment model.

The annotated relaxation states can take various forms, such as relaxed, somewhat relaxed, slightly relaxed, not relaxed, and/or the like. Alternatively, the annotated relaxation states include numerical values.

In some implementations, EEG data includes EEG wave signals for the reference users, such as $\alpha$ waves, $\beta$ waves, $\theta$ waves, delta waves, sleep spindle waves and the like. By analyzing the features of EEG wave signals, the apparatus can determine the annotated relaxation states of the reference users. For example, if the parameter of an $\alpha$ wave feature for a certain reference user is in the range of 8 to 13 Hz with an amplitude from 20 to 100 $\mu$V, then the current state of the user can be determined as "somewhat relaxed."

It should be noted that the above example is for illustrative purposes and should not be considered as limiting the present disclosure.

At S202, the physiological parameters of the reference users are input into an initial relaxation state assessment model to obtain predicted relaxation states of the reference users.

In some examples, the initial relaxation state assessment model can be a network model that has not reached a usable state yet, and the apparatus can later adjust and train its network parameters to make it usable. In other examples, the initial relaxation state assessment model can be a usable network model, and the apparatus can update the network model periodically, or update the network model in response to a preset update condition being satisfied, such as, for example, a user's request for updating the network model is received, or the relaxation effect of recommended music is lower than a preset threshold, or the like.

In some implementations, by inputting the physiological parameters of reference users into the initial relaxation state assessment model, the apparatus predicts the relaxation states of the reference users, where the predicted relaxation states can include relaxed, somewhat relaxed, slightly relaxed, not relaxed, and/or the like.

At S203, the initial relaxation state assessment model is modified based on differences between the annotated relaxation states and the predicted relaxation states, to generate a trained or updated relaxation state assessment model.

Specifically, the apparatus can compare an annotated relaxation state with a predicted relaxation state to determine the difference between them. For example, a correction gradient can be determined, such as a gradient descent, stochastic gradient descent, or the like, and the initial assessment model is then modified to generate a trained or updated relaxation state assessment model. The specific implementation manners for the correction gradient in this disclosure can be determined as needed.

At S204, one or more physiological parameters of the target user collected by the wearable device in real time are obtained.

At S205, the one or more physiological parameters of the target user are input into the generated relaxation state assessment model to determine the current relaxation state of the target user.

The previous implementations can be referred to for specific implementations of S204 and S205, which will not be described here.

At S206, at least one piece of target recommendation music is determined based on at least one of the current relaxation state of the target user or the relaxation parameters corresponding to multiple pieces of music to be recommended. The target recommendation music is then played for the target user.

Before determining at least one piece of target recommendation music based on at least one of the current relaxation state of the target user or the relaxation parameters corresponding to multiple pieces of music to be recommended, the apparatus needs to obtain the relaxation parameters corresponding to multiple pieces of music to be recommended.

In some implementations, a relaxation parameter of each piece of music to be recommended can be determined by a relaxation parameter estimation model. The input of the relaxation parameter estimation model optionally includes the musical characteristics of each piece of music to be recommended and at least one of the attribute information of the target user, music preference of the target user or historical music playback data of the target user. In some other implementations, if there is no relevant data of the target user, music preference or historical music playback data of users belonging to a same user group with the target user can be used to determine the relaxation parameters.

The output of the relaxation parameter estimation model includes information indicating one or more relaxation parameters of the music, such as a numerical value indicating the relaxation efficacy of the music for the target user and/or the like.

For ease of understanding, the following provides an illustration of some implementations of how to generate the relaxation parameter estimation model. In some implementations, the following procedures are included.

A second training data set is obtained, where the second training data set includes first relaxation curves of multiple reference users when multiple pieces of reference music are played respectively, and includes second relaxation curves of the multiple reference users when the multiple pieces of reference music are not played. In some examples, the multiple pieces of reference music can be the candidate music in the candidate music library. In this case, the multiple pieces of reference music can be the same as the multiple pieces of music to be recommended, or partially overlap with the multiple pieces of music to be recommended, or different from the multiple pieces of music to be recommended. In other examples, the plurality of reference music can be collected by other means, such as from an open music library or the like.

A relaxation parameter of a piece of reference music for a reference user is annotated.

The musical characteristics of a piece of reference music and the attribute information of a reference user are input into the initial relaxation parameter estimation model to obtain a predicted relaxation parameter of the piece of music to be recommended for the reference user.

The initial relaxation parameter estimation model is modified based on a difference between the annotated relaxation parameter and the predicted relaxation parameter to generate a trained or updated relaxation parameter estimation model.

In some implementations, both the first relaxation curve and the second relaxation curve can be represented as functions of time, such as taking time as the horizontal axis and fatigue level of the reference user as the vertical axis, or taking time as the horizontal axis and relaxation level of the reference user as the vertical axis. The first relaxation curve and the second relaxation curve of a reference user can be obtained by obtaining the relaxation state of the reference user in real time when a piece of reference music is being played and not being played respectively. In this way, the relaxation states of the reference user on different time points are obtained when the reference music is being played for the reference user, so as to obtain the first relaxation curve of the reference user, and the relaxation states of the reference user on different time points are obtained when the reference music is not being played for the target user, so as to obtain the second relaxation curve of the reference user. The relaxation curves of a reference user when listening to different styles of music can be the same or different.

In some implementations, the music characteristics can include rhythm, music intervals, harmony, pitch, and/or the like, and before inputting the musical characteristics of each piece of music into the relaxation parameter estimation model, the music characteristics can be optionally quantified. In some implementations, the attribute information can include age, gender, weight, location, sleep habits, circadian rhythm, music preferences, and/or the like.

The relaxation parameter, which corresponds to the relaxation efficiency of the music, can vary for different music genres. Additionally, a same piece of music can have different relaxation parameters for different target users.

Since the second relaxation curve is the relaxation curve when the reference music is not played, the apparatus can calculate an integration of the difference between the first relaxation curve and the second relaxation curve over time, so as to annotate the relaxation parameter of the reference music for the reference user.

In some examples, the initial relaxation parameter estimation model can be a network model that has not yet reached a usable state, and the apparatus can adjust and train its network parameters to make it usable. In other examples, the initial relaxation parameter estimation model can be a usable network model, and the apparatus can update the network model periodically, or update the network model in response to a preset update condition being satisfied. In some implementations, by inputting the musical characteristics of a piece of reference music to be recommended and the attribute information of a reference user into the initial relaxation parameter estimation model, the predicted relaxation parameter of the piece of music to be recommended for the reference user can be obtained.

The apparatus can compare the annotated relaxation parameter with the predicted relaxation parameter to determine a difference between them. For example, a correction gradient, such as gradient descent, stochastic gradient descent or the like, can be determined, and the initial relaxation parameter estimation model is modified to generate a trained or updated relaxation parameter estimation model.

Furthermore, after determining the relaxation parameter estimation model, the apparatus can input the musical characteristics of each piece of music to be recommended and the attribute information of the target user to determine the relaxation parameters corresponding to multiple pieces of music to be recommended. In some implementations, the apparatus can also input the relaxation states of the target user in one or more previous time windows into the relaxation parameter estimation model. For example, if a 5-minutes time window is adopted, the relaxation state of the target user 5 minutes before the current time can be input into the relaxation parameter estimation model. In this case, the predicted relaxation parameters can be more accurate for the current status of the target user.

Subsequently, the apparatus can determine at least one piece of target recommendation music based on at least one of the current relaxation state of the target user or the relaxation parameters corresponding to multiple pieces of music to be recommended. In some implementations, after obtaining the relaxation parameters corresponding to multiple pieces of music to be recommended, the relaxation parameters are normalized, and the at least one piece of target recommendation music is determined based on the normalized relaxation parameters corresponding to multiple pieces of music to be recommended.

At S207, the at least one piece of target recommendation music is played for the target user.

Previous implementations can be referred to for specific implementations of S207, which will not be repeated herein.

In the implementations, the apparatus first obtains a first training data set, where the first training data set includes physiological parameters of multiple reference users and relaxation states annotated based on the EEG data of multiple reference users. The apparatus then inputs the physiological parameters of reference users into the initial relaxation state assessment model to obtain predicted relaxation states. Subsequently, based on the difference between annotated relaxation states and the predicted relaxation states, the initial relaxation state assessment model is modified to generate a trained or updated relaxation state assessment model. Next, the apparatus obtains one or more physiological parameters of the target user collected by the wearable device, and inputs the physiological parameters of the target user into the generated relaxation state assessment model to determine the current relaxation state of the target user. Then, based on at least one of the current relaxation state of the target user or the relaxation parameters corresponding to multiple pieces of music to be recommended, at least one piece of target recommendation music is determined for playback to the target user. Therefore, by determining the training data set with reference users and modifying the relaxation state assessment model, the one or more relaxation parameters for each piece of music to be recommended can be more accurately determined, allowing for more accurate and effective provision of relaxation-inducing music for the target user.

There are many ways to determine the multiple pieces of music to be recommended. In some implementations, the music to be recommended can be a music segment pre-set in the music library and can have various styles. Before determining at least one piece of target recommendation music, the apparatus can obtain some of the music to be recommended. The following disclosure will describe some implementation manners for obtaining music to be recommended.

The multiple pieces of music to be recommended can be part or all of the candidate music in the music library. In some examples, the multiple pieces of music to be recommended can be music with some certain music characteristics. Optionally, the multiple pieces of music to be recommended can have a certain rhythm, harmony, pitch, or belong to a certain music style, or a combination of at least any two of the above. For example, the multiple pieces of candidate music in the music library can be divided into multiple groups according to their characteristics, each corresponding to a music style, and the apparatus can determine a target music style from multiple music styles, and then determine a part or all of the candidate music belonging to the target music style to be the multiple pieces of music to be recommended.

There are various manners to determine the target music style. In some implementations, relaxation parameters of the multiple music styles for the target user are determined, and the target music style is selected from the multiple music styles based on the relaxation parameters of the multiple music styles. For instance, the music style with a highest relaxation parameter or with a relaxation parameter higher than a preset threshold for the target user is determined to be the target music style. For another instance, the target music style is randomly selected from the multiple music styles with the relaxation parameters as weights.

In some implementations, the apparatus can use the relaxation parameter estimation model to obtain the relaxation parameters of the multiple music styles for the target user. In some other implementations, the apparatus can use a different model to obtain the relaxation parameters of the multiple music styles for the target user, such as a second relaxation parameter estimation model.

In one example, the apparatus first obtains at least one of the music preferences, attribute information, or historical sleep data of the target user. Then, based on at least one of the music preferences, the attribute information, or the historical sleep data of the target user, a target music style for the target user is determined. Subsequently, one or more pieces of candidate music belonging to the target music style are obtained from the candidate music library as the multiple pieces of music to be recommended.

Due to the diversity of users, the types of sleep aid music suitable for different users vary. To achieve precise personalized music recommendations, personalized information of a user is used for determining the target music style or the multiple pieces of music to be recommended. The music preference of the target user includes Chinese-style music, instrumental music, white noise, classical music, opera or the like. The user attribute information of the target user includes age, gender, height, weight and/or the like. The historical sleep data of the target user can include sleep data of one or several previous days. For example, the historical sleep data of the target user includes sleep data of the target user in the last day. The historical sleep data can be collected by the wearable device or other sleep tracking device. The historical sleep data can include various parameters that provide insights into sleep patterns and sleep quality of the target user, such as sleep duration, sleep onset latency, sleep stages, sleep heart rate, sleep interruption, sleep quality score and/or the like.

In another example, one or more other parameters are also taken into consideration in determining the target music style, such as music playback popularity, historical music playback data of users or of the target user, initial relaxation state of the target user or the like. The music playback popularity can represent the popularity of the music among users, and can include a frequency of playback or being chosen by users, a frequency that the music is played in its entirety, or the like. The historical music playback data of users or the historical music playback data of the target user can be stored in local storage or stored remotely, and the users can be users in a user group to which the target user belongs. The historical music playback data of the users or the target user includes one or more pieces of music that were played to the users or to the target user, and in some examples, the historical music playback data of the users or the target user further includes at least one of user operations or the relaxation states (or relaxation state curves) of the users or the target user corresponding to the music historically played.

In some examples, after the relaxation music service is activated, the apparatus can first determine the target music style, and then determine at least one target recommendation music according to the target music style and current relaxation state of the target user at each time window, thereby creating a music recommendation mode with offline genre determination and music segment synthesis and recommendation in real-time, and different pieces of music played for a user in one relaxation music service are similar with each other without causing hearing abruption of the user. In some other examples, the target music style can be determined for each or several continuous time windows, and the target music styles determined for different time windows can be different during one relaxation music service. For example, at one night, the user initiates the relaxation music service and listens to the relaxation music for 20 minutes. Within the 20 minutes, 5 pieces of music are recommended and played for the user. In this example, the target music style can be determined once, and 5 pieces of target recommendation music belong to the same target music style. Alternatively, the target music style can be determined for more than once, and at least two of the 5 pieces of target recommendation music correspond to different target music styles.

It should be noted that, the above examples for determining the target music style are for illustrative purposes only.

After determining the target music style currently corresponding to the target user, the apparatus can obtain multiple pieces of candidate music belonging to the target music style from the candidate music library as multiple pieces of music to be recommended. The music to be recommended can include multiple pieces of music. The candidate music library includes multiple pieces of candidate music. The candidate music can be established by obtaining multiple pieces of music. In one example, multiple songs or music tracks are obtained, and then segmented into at least one music segment with a certain length, each one being taken as a piece of candidate music and corresponding to a certain or a combination of music characteristics. In this case, the multiple pieces of music to be recommended can include multiple music segments chosen from the candidate music library.

FIG. 3 is a schematic diagram of the method for music recommendation based on the wearable device according to another implementation disclosed herein. In this implementation, a candidate music library is established, and the candidate music library includes a plurality of music segments with a certain length, i.e., multiple pieces of candidate music. The multiple pieces of music to be recommended can be chosen from the candidate music library.

As shown in FIG. 3, the method for music recommendation based on wearable devices can include the following procedures S301 to S306.

At S301, one or more physiological parameters of the target user collected by the wearable device are acquired.

At S302, the one or more physiological parameters of the target user are processed with a relaxation state assessment model to determine the current relaxation state of the target user.

Any implementation mentioned above can be referred to for specific implementations of S301 and S302, which will not be repeated in detail herein.

At S303, at least one piece of target recommendation music is determined based on at least one of the current relaxation state of the target user or the relaxation parameters corresponding to multiple pieces of music to be recommended.

At S304, in response to the at least one piece of target recommendation music including multiple pieces of target recommendation music, the multiple pieces of target recommendation music are merged in pairs to obtain at least one piece of merged music.

The multiple pieces of target recommendation music can constitute at least one pair of target recommendation music, and each pair includes two pieces of target recommendation music. In some implementations, the two pieces of target recommendation music in one pair can be adjacent during playback. For instance, the multiple pieces of target recommendation music can be ranked and played to the user in a descending or ascending order of their relaxation parameters, and one pair of target recommendation music includes two pieces of target recommendation music with adjacent relaxation parameters in the ranked relaxation parameter sequence. For another instance, the playback order of multiple pieces of target recommendation music can be determined randomly. In some other implementations, two pieces of target recommendation music in one pair can have at least one common music characteristics, such as a same or similar rhythm, a same or similar melody, or the like. In some other implementations, two pieces of target recommendation music in one pair can be randomly selected from the multiple pieces of target recommendation music. No limitation is set on how to determine at least one pair of target recommendation music in this disclosure.

There can be various ways to merge the multiple pieces of target recommendation music in pairs.

In some implementations, weighted merging can be performed on each pair of two adjacent pieces of target recommendation music based on the playback sequence of the multiple pieces of target recommendation music, to obtain at least one piece of merged music.

In some implementations, the apparatus can extract, based on the playback sequence, a first music segment of a first preset duration from the earlier (piece) of each pair of target recommendation music by starting from the end of the earlier (piece of) music, and extract a second music segment of a second preset duration from the latter of the pair of target recommendation music by starting from the beginning of the latter music. The earlier of the pair of target recommendation music refers to the music piece from the pair that is played before the other one. The latter of the pair of target recommendation music refers to the other music piece from the pair that is played after the earlier piece.

In some implementations, if there are multiple pieces of target recommendation music, after determining the multiple pieces of target recommendation music, the apparatus can determine a playback sequence for the target recommendation music in a descending order of relaxation parameters, and then merge each pair of adjacent target recommendation music.

For example, if the playback order of at least one piece of target recommendation music is determined based on relaxation parameters to be A, B, C, the apparatus can pair the target recommendation music as (A, B) and (B, C). For the first pair (A, B), the apparatus can extract, by starting from the end, the first music segment A1 of a preset duration (e.g., 20 s) from music A, and extract, by starting from the beginning, the second music segment 81 of 20 s from music B.

Furthermore, the first music segment and the second music segment can be merged to obtain at least one piece of merged music. It should be understood that there can be various ways to merge the first music segment and the second music segment.

In some implementations, the apparatus can separately add respective sub-segments of the first music segment and the second music segment, so as to incorporate elements from both pieces of target recommendation music into the fused music.

In some implementations, the apparatus can also merge respective sub-segments of the first music segment and the second music segment separately based on a first weight sequence and a second weight sequence to generate merged music. The first and second weight sequences each include multiple weight values. The weight values in the first weight sequence gradually decrease, and the weight values in the second weight sequence gradually increase. Each weight value in the first weight sequence corresponds to a weight value in the second weight sequence, and a sum of each weight value in the first weight sequence with its corresponding weight value in the second weight sequence equals to 1.

The first weight sequence includes weight sequences corresponding to multiple sub-segments of the first music segment, and the second weight sequence includes weight sequences corresponding to multiple segments of the second music segment. A plurality of weight values in the first weight sequence decrease, and a plurality of weight values in the second weight sequence increase. For instance, the first weight value of the first weight sequence is 1 while the first weight value of the second weight sequence is 0, and the last weight value of the first weight sequence is 0 while the last weight value of the second weight sequence is 1.

For another instance, if the first music segment is A1, including sub-segments a1, a2 and a3, and the second music segment is B1, including sub-segments b1, b2 and b3. The weight values corresponding to the sub-segments a1, a2 and a3 in the first weight sequence are 0.8, 0.5 and 0.3, respectively, and the weight values corresponding to the sub-segments b1, b2 and b3 in the second weight sequence are 0.2, 0.5 and 0.7, respectively.

By using the above-mentioned merging method, the generated merged music includes a decreasing proportion of the first music segment A1 and an increasing proportion of the second music segment B1. Therefore, the target recommendation music A fades out and the target recommendation music B fades in during playback, thereby achieving a smoother music transition and generating more pieces of relaxation music in real-time.

In some examples, the merging processing is performed on two pieces of music of a same music style. For instance, the multiple pieces of target recommendation music all belong to the target music style. In this case, the merging can be performed on part of all pairs of the target recommendation music. In some examples, the merging can be performed only when a difference between one or more music characteristics of two pieces of the target recommendation music in one pair of target recommendation music exceeds a certain threshold. In other examples, the merging can be performed on all pairs of the target recommendation music, or not be performed on any pair of the target recommendation music.

It should be noted that the above examples for merging the two pieces of target recommendation music are for illustrative purposes.

At S305, a playback order of the multiple pieces of target recommendation music and the at least one piece of merged music are determined based on two pieces of target recommendation music corresponding to each piece of merged music.

In this disclosure, in order to avoid sensory disruptions caused by music transitions during sequential playback of multiple pieces of target recommendation music, and to minimize disturbances to the user, the multiple pieces of target recommendation music are merged in pairs (pairwise) to generate at least one piece of merged music each containing elements of two pieces of target recommendation music. Therefore, during playback, the merged music can be configured to be played between its corresponding two pieces of target recommendation music, creating a seamless music transition process and enhancing the user experience.

For example, for a playback sequence of target recommendation music A, B and C, the apparatus can set the music generated by merging A and B to be played between A and B, and set the music generated by merging B and C to be played between B and C.

In this case, the similarity between different pieces of target recommendation music increases, abrupt music transitions for users are avoided, and a more extensive library of relaxing music are generated in a more real-time manner.

At S306, the multiple pieces of target recommendation music and the at least one piece of merged music are sequentially played based on the playback order.

In some implementations, the apparatus can use a playback device to play the multiple pieces of target recommendation music and the at least one piece of merged music according to the playback order. In addition, the one or more physiological parameters of the target user are collected by the wearable device in real-time, thereby enabling adjustment of recommendation music based on the real-time relaxation state of the target user.

In this disclosure, the apparatus first obtains the physiological parameters of the target user collected by the wearable device, inputs the physiological parameters of the target user into a trained relaxation state assessment model to determine the current relaxation state of the target user. Then, based on at least one of the current relaxation state of the target user or the relaxation parameters corresponding to multiple pieces of music to be recommended, at least one piece of target recommendation music is determined. Subsequently, multiple pieces of target recommendation music are merged in pairs to obtain at least one piece of merged music, and the playback order of the multiple pieces of target recommendation music and the at least one piece of merged music are determined based on two pieces of target recommendation music corresponding to each merged music. Finally, the multiple pieces of the target recommendation music and the at least one piece of merged music are sequentially played based on the playback order. By playing the fused music generated from the multiple pieces of target recommended music and corresponding target recommended music in a certain order, not only enabling personalized stress-relief relaxation music to be provided to different target users, avoiding the target users from feeling bored with a monotonous music library, but also making the music transition seamless, allowing for a more accurate and effective delivery of relaxing music to the target users.

To realize the implementations described above, this disclosure also presents an apparatus for music recommendation based on a wearable device. FIG. 4 is a structural diagram of the apparatus for music recommendation based on the wearable device provided in some implementations of this disclosure.

As shown in FIG. 4, the apparatus for music recommendation based on the wearable device includes: an acquisition module 410, a first determination module 420, a second determination module 430, and optionally a playback module 440.

The acquisition module 410 is configured to obtain one or more physiological parameters of the target user collected by the wearable device.

The first determination module 420 is configured to processing the one or more physiological parameters of the target user with a relaxation state assessment model to determine a current relaxation state of the target user.

The second determination module 430 is configured to determine at least one piece of target recommendation music based on at least one of the current relaxation state of the target user or relaxation parameters corresponding to multiple pieces of music to be recommended, wherein the at least one piece of target recommendation music is configured to be played for the target user.

The playback module 440 is configured to play the at least one piece of target recommendation music for the target user.

In some implementations, the relaxation state assessment model is generated with a first training data set, where the first training data set includes physiological parameters of multiple reference users and relaxation states annotated based on EEG data of the multiple reference users.

In some implementations, the second determination module 430 is further configured to: obtain at least one of music preferences, attribute information, or historical sleep data of the target user; determine a target music style corresponding to the current relaxation state of the target user based on at least one of the music preferences, the attribute information, or the historical sleep data of the target user; and obtain candidate music belonging to the target music style from a candidate music library as multiple pieces of music to be recommended based on the music style of the multiple pieces of music to be recommended.

In some implementations, the second determination module 430 is further configured to: obtain music features corresponding to multiple pieces of music to be recommended; and determine the relaxation parameters corresponding to the multiple pieces of music to be recommended with a relaxation parameter estimation model based on the music features of multiple pieces of music to be recommended and at least one of attribute information of the target user or historical music playback data of the target user.

In some implementations, the relaxation parameter estimation model is generated with a second training data set, and the second training data set comprises first relaxation curves obtained during playback of multiple pieces of reference music for multiple reference users and second relaxation curves obtained during the multiple pieces of reference music not being played for the multiple reference users.

In some implementations, the playback module includes: a fusion unit, configured to merge multiple pieces of target recommendation music in pairs to obtain at least one piece of merged music; a determination unit, configured to determine the playback order of multiple pieces of target recommendation music and merged music based on two pieces of target recommendation music corresponding to each piece of merged music; and a playback unit, configured to sequentially play the multiple pieces of target recommendation music and merged music based on the playback order.

In some implementations, the fusion unit includes: a first extraction subunit, configured to extract a first music segment of a predetermined duration from the previous of each pair of target recommendation music; a second extraction subunit, configured to extract a second music segment of a predetermined duration from the latter of the pair of target recommendation music; and a merging subunit, configured to merge the first music segment and the second music segment to obtain merged music.

In some implementations, the merging subunit is configured to: merge, based on a first weight sequence and a second weight sequence, respective sub-segments of the first music segment and of the second music segment to generate merged music.

The first weight sequence and the second weight sequence respectively include a plurality of weight values. A plurality of first weight values in the first weight sequence gradually decrease, a plurality of second weight values in the second weight sequence gradually increase, and the sum of each first weight value with a corresponding second weight value is 1.

In this implementation, the apparatus first obtains the physiological parameters of the target user collected by the wearable device and inputs them into a trained relaxation state assessment model to determine the current relaxation state of the target user. Then, based on at least one of the current relaxation state of the target user or relaxation parameters corresponding to multiple pieces of music to be recommended, at least one piece of target recommendation music is determined, which is configured to be played for the target user. In this way, by wearing the wearable device by the target user, the relaxation state of the target user can be assessed in real-time. In addition, the method balances the portability of wearable devices and the fitting ability of machine learning technology, providing accurate and effective music recommendations that can induce relaxation for the target user.

According to the implementations disclosed herein, electronic devices, computer-readable storage media, and non-transitory computer program products are also provided.

Figure 5:
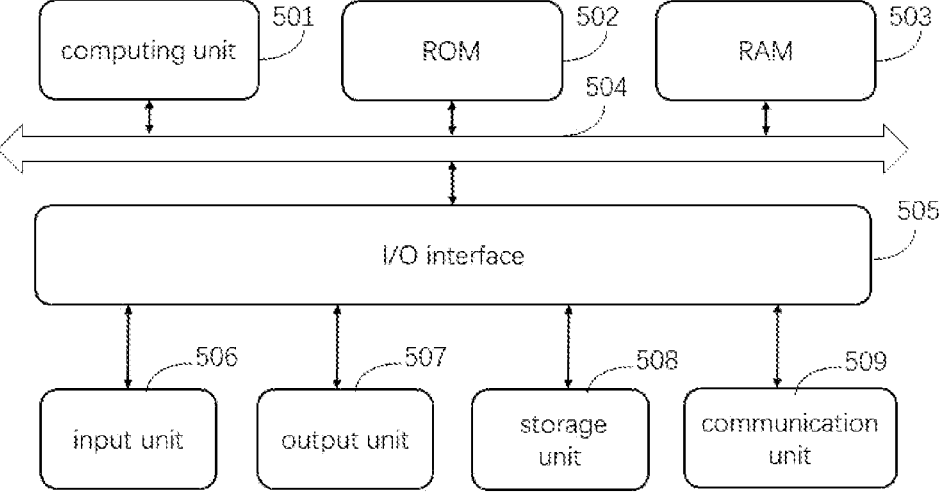
FIG. 5 is a structural block diagram of an example electronic device.

FIG. 5 shows a schematic diagram of an example electronic device 500 that can be used to realize the implementations disclosed herein. The electronic device is designed to represent various forms of digital computers, such as laptops, desktop computers, workstations, personal digital assistants, servers, blade servers, mainframe computers, and the like. The electronic device can also represent various forms of mobile devices, such as personal digital assistants, cell phones, smartphones, wearable devices, and the like.

In some implementations, the electronic device mentioned above can be a wearable device configured to collect the physiological parameter of the target user and to determine target recommendation music based on the method for music recommendation disclosed herein, and the target recommendation music can be played on the wearable device directly to the target user.

In some implementations, the electronic device mentioned above can be a mobile terminal, where the wearable device collects physiological parameters of the target user and transmits the collected physiological parameters to the mobile terminal. The user of the mobile terminal is typically the same as the user of the wearable device, but in some cases, the user of the mobile terminal may be different from the user of the wearable device. The application running on the mobile terminal processes the collected data. The mobile terminal is wirelessly connected to the wearable device. In some implementations, the electronic device communicates wirelessly with the wearable device in a short range. The application running on the mobile terminal can be configured to determine target recommendation music based on the method for music recommendation disclosed herein, and to play the target recommendation music to the target user.

In some implementations, the electronic device can be a server, where the wearable device is configured to collect physiological parameters of the target user, and the wearable device transmits the collected physiological parameters to the mobile terminal. The user of the mobile terminal is typically the same as the user of the wearable device, but in some cases, the user of the mobile terminal may be different from the user of the wearable device. An application runs on the mobile terminal, and the mobile terminal transmits the received physiological parameters to a remote server (e.g., a cloud server). A program running on the remote server processes the data. The mobile terminal is wirelessly connected to the wearable device, and the remote server is wirelessly connected to the mobile terminal. The remote server can be configured to determine target recommendation music based on the method for music recommendation disclosed herein, and transmit the target recommendation music to the mobile terminal for playback to the target user.

The components shown and their connections, relationships, and functions are provided as examples and are not intended to limit the implementations disclosed herein.

As shown in FIG. 5, the device 500 includes a computing unit 501 capable of executing various appropriate actions and processing based on a computer program stored in read-only memory (ROM) 502 or loaded from a storage unit 508 into random access memory (RAM) 503. Various programs and data required for the operation of device 500 can alternatively be stored in RAM 503. The computing unit 501, ROM 502, and RAM 503 are interconnected via bus 504. An input/output (I/O) interface 505 is also connected to the bus 504.

Several components of device 500 are connected to the I/O interface 505, including input unit 506 (e.g., keyboard, mouse, etc.), output unit 507 (e.g., various types of displays, speakers, etc.), storage unit 508 (e.g., disk, optical disc, etc.), and communication unit 509 (e.g., network card, modem, wireless communication transmitter/receiver, etc.). The communication unit 509 allows the device 500 to exchange information/data with other devices through communication networks such as the internet and/or various telecommunications networks.

The computing unit 501 can be any type of general-purpose and/or specialized processing component with processing and computation capabilities. Examples of the computing unit 501 include, but are not limited to, a central processing unit (CPU), a graphics processing unit (GPU), various specialized artificial intelligence (AI) computing chips, a computing unit running a machine learning model algorithm, a digital signal processor (DSP), and any type of appropriate processor, controller, microcontroller, and the like. The computing unit 501 executes various procedures and processing described herein, such as the method for music recommendation based on the wearable device. For example, in some implementations, the method for music recommendation based on the wearable device can be implemented as a computer software program tangibly contained in machine-readable medium, such as a storage unit 508. In some implementations, part or all of the computer program can be loaded onto the device 500 through the ROM 502 and/or the communication unit 509. When the computer program is loaded into the RAM 503 and executed by the computing unit 501, one or more procedures of the method for music recommendation based on the wearable device described above can be performed. Alternatively, in other implementations, the computing unit 501 can be configured to perform the method for music recommendation based on the wearable device through other appropriate means, such as firmware.

Various implementations of the system and techniques described herein can be implemented in a digital electronic circuitry, an integrated circuitry, a field-programmable gate array (FPGA), an application-specific integrated circuit (ASIC), an application-specific standard product (ASSP), a system-on-chip (SOC), a complex programmable logic device (CPLD), a hardware, firmware, software, and/or combinations thereof. These various implementations can include implementing in one or more computer programs executable and/or interpretable by a processing system including at least one programmable processor. The programmable processor can be a dedicated or general-purpose programmable processor that can receive data and instructions from a storage system, at least one input device, and at least one output device, and can transmit data and instructions to the storage system, at least one input device, and at least one output device.

The program codes for implementing the method described herein can be written in any combination of one or more programming languages. The program codes can be provided to a processor or controller of a general-purpose computer, a special-purpose computer, a field-programmable gate array (FPGA), or other programmable data processing device, such that when executed by the processor or controller, the functions/operations specified in the flowchart and/or block diagram are implemented. The program code can be executed entirely on the machine, or partially on the machine and partially on a remote machine, or entirely on a remote machine or server.

In the context of this disclosure, machine-readable medium can be non-transitory, tangible medium containing or storing programs for use by an instruction-executing system, apparatus, or device, or for use in conjunction with an instruction-executing system, apparatus, or device. The machine-readable medium can be machine-readable signal medium or machine-readable storage medium. The machine-readable medium can include, but is not limited to, electronic, magnetic, optical, electromagnetic, infrared, or semiconductor systems, apparatuses, or devices, or any suitable combination thereof. More specific examples of the machine-readable storage medium can include electrical connections based on one or more wires, portable computer disks, hard drives, random access memory (RAM), read-only memory (ROM), erasable programmable read-only memory (EPROM or flash memory), optical fibers, compact disc read-only memory (CD-ROM), optical storage devices, magnetic storage devices, or any suitable combination thereof.

To facilitate interaction with the target user, the systems and technologies described herein can be implemented on a computer. The computer includes a display device (e.g., a CRT or LCD monitor) for presenting information to the target user, as well as a keyboard and pointing device (e.g., a mouse or trackball) through which the target user can provide input to the computer, and other types of devices can also be used for interaction with the target user. For example, feedback provided to the target user can take the form of any type of sensory feedback (e.g., visual, auditory, or tactile feedback), and input from the target user can be received in any form (including voice input, speech input, or tactile input).

The systems and technologies described herein can be implemented in various types of computing systems, including computing systems with backend components (e.g., as data servers), computing systems with middleware components (e.g., as application servers), computing systems with frontend components (e.g., as user computers with graphical user interfaces or web browsers through which the target user can interact with the systems and technologies described here), or any combination thereof. The components of the system can be interconnected through digital data communications in any form or with any medium (e.g., communication networks). Examples of communication networks include local area networks (LANs), wide area networks (WANs), the internet, and block chain networks.

A computer system can include a client and a server. The client and the server are typically geographically separated and interact with each other through communication networks. The relationship between the client and the server can be generated by running a computer program on respective computers that have client-server relationships. The server can be a cloud server, also known as a cloud computing server or a cloud host, which is a type of host product in the cloud computing service system. They address the challenges of managing traditional physical hosts and Virtual Private Server (VPS) services, which have limited scalability. The server can also be part of a distributed system or a server with block chain technologies incorporated.

In the disclosed implementations, the apparatus first obtains one or more physiological parameters of the target user collected by the wearable device. The one or more parameters are then input into a trained relaxation state assessment model to determine the current relaxation state of the target user. Based on at least one of the current relaxation state of the target user or the relaxation parameters corresponding to multiple pieces of music to be recommended, at least one piece of target recommendation music is determined. The target recommendation music is configured to be played for the target user. Therefore, by wearing the wearable device, the relaxation state of the target user can be assessed in real-time. In addition, the method balances the portability of wearable devices with the adaptability of machine learning techniques, providing accurate and effective relaxation-inducing music for the target user.

As used in this disclosure, the term "or" is intended to mean an inclusive "or" rather than an exclusive "or" for the two or more elements it conjoins. The term "and/or" as used in this disclosure is intended to mean an "and" or an inclusive "or." That is, unless specified otherwise or clearly indicated otherwise by the context, "X includes A and/or B" is intended to mean that X can include any combinations of A and B, which can mean A, B, or A+B. Similarly, "X includes at least one of A, B, and C" is intended to be used as an equivalent of "X includes A, B, and/or C." The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. The use of any and all examples, or language indicating that an example is being described (e.g., "such as"), provided herein is intended merely to better illuminate the disclosure and does not pose a limitation on the scope of the disclosure unless otherwise claimed.

It should be understood that, various modifications, rearrangements, additions, or deletions of steps can be made using the various forms of processes described above. For example, the procedures described in this disclosure can be performed in parallel, sequentially, or in a different order, as long as they achieve the desired results of the disclosed technical solutions. The disclosure does not impose limitations herein.

The specific implementations described above do not constitute a limitation on the scope of this disclosure. Those skilled in the art should understand that various modifications, combinations, sub-combinations, and substitutions can be made based on design requirements and other factors.

What is claimed is:

1. A method for music recommendation using a wearable device, comprising:

obtaining one or more physiological parameters of a target user collected by the wearable device;

processing, by a processor, the one or more physiological parameters of the target user with a relaxation state assessment model to determine a current relaxation state of the target user;

determining, by the processor, at least one piece of target recommendation music based on at least one of the current relaxation state of the target user or relaxation parameters corresponding to multiple pieces of music to be recommended, wherein the at least one piece of target recommendation music is configured to be played for the target user, wherein the at least one piece of target recommendation music comprises multiple pieces of target recommendation music including a first music piece and a second music piece;

merging the multiple pieces of target recommendation music to obtain at least one piece of merged music, further comprising:

merging respective sub-segments, of a first music segment extracted from the first music piece and a second music segment extracted from the second music piece, based on a first weight sequence corresponding to the first music segment and a second weight sequence corresponding to the second music segment, wherein the first weight sequence and the second weight sequence each contain multiple weight values, the first weight sequence gradually decreasing in value and the second weight sequence gradually increasing in value; and determining a playback order of the multiple pieces of target recommendation music and the at least one piece of merged music, wherein the multiple pieces of target recommendation music and the at least one piece of merged music are played for the target user in sequence based on the playback order.

2. The method according to claim 1, wherein the determining, by the processor, at least one piece of target recommendation music based on at least one of the current relaxation state of the target user or relaxation parameters corresponding to multiple pieces of music to be recommended comprises:

ranking the multiple pieces of music to be recommended in a descending order based on the relaxation parameters corresponding to the multiple pieces of music to be recommended;

determining at least one piece of target recommendation music from the multiple pieces of music to be recommended according to the ranking of the multiple pieces of music to be recommended.

3. The method according to claim 1, wherein the determining, by the processor, at least one piece of target recommendation music based on at least one of the current relaxation state of the target user or relaxation parameters corresponding to multiple pieces of music to be recommended comprises:

obtaining at least one previous relaxation state of the target user; and determining at least one target recommendation music based at least in part on a difference of the current relaxation state and the at least one previous relaxation state of the target user.

4. The method according to claim 1, wherein the determining, by the processor, at least one piece of target recommendation music based on at least one of the current relaxation state of the target user or relaxation parameters corresponding to multiple pieces of music to be recommended comprises:

in response to determining that the target user is more relaxed based on the current relaxation state and at least one previous relaxation state, determining at least one piece of target recommendation music based at least in part on a piece of music currently being played for the target user, or in response to determining that the target user is not more relaxed based on the current relaxation state and the at least one previous relaxation state, determining at least one piece of target recommendation music based on the relaxation parameters corresponding to the multiple pieces of music to be recommended.

5. The method according to claim 1, wherein the relaxation state assessment model is generated with a first training data set, and the first training data set comprises physiological parameters of multiple reference users and relaxation states annotated based on EEG data of the multiple reference users.

6. The method according to claim 1, further comprising:
before determining the at least one piece of target recommendation music based on at least one of the current relaxation state of the target user or relaxation parameters corresponding to multiple pieces of music to be recommended:
obtaining at least one of music preferences, attribute information, or historical sleep data of the target user;
determining a target music style corresponding to the target user based on at least one of the music preferences, attribute information, or historical sleep data of the target user; and
determining multiple pieces of candidate music belonging to the target music style from a candidate music library as the multiple pieces of music to be recommended.

7. The method according to claim 1, further comprising:
before determining the at least one piece of target recommendation music based on at least one of the current relaxation state of the target user or relaxation parameters corresponding to multiple pieces of music to be recommended:
obtaining music features of multiple pieces of music to be recommended; and
determining the relaxation parameters corresponding to the multiple pieces of music to be recommended with a relaxation parameter estimation model based on the music features of multiple pieces of music to be recommended and at least one of attribute information of the target user or historical music playback data of the target user.

8. The method according to claim 7, wherein the relaxation parameter estimation model is generated with a second training data set, and the second training data set comprises first relaxation curves obtained during playback of multiple pieces of reference music for multiple reference users and second relaxation curves obtained during the multiple pieces of reference music not being played for the multiple reference users.

9. The method according to claim 1, wherein the at least one piece of target recommendation music is one piece of target recommendation music; and
wherein the method further comprises:
after determining the at least one target recommendation music, merging the target recommendation music with a piece of music currently being played for the target user to obtain a piece of merged music, wherein the merged music is played for the target user before playing the target recommendation music.

10. The method according to claim 1, wherein merging the multiple pieces of target recommendation music to obtain at least one piece of merged music comprises:
determining, based on the relaxation parameters of the multiple pieces of target recommendation music, at least one pair of target recommendation music from the multiple pieces of target recommendation music, where each pair of target recommendation music comprises two pieces of adjacent target recommendation music; and
merging the two pieces of adjacent target recommendation music to obtain a piece of merged music;
wherein the merged music is played for the target user between corresponding two pieces of adjacent target recommendation music.

11. The method according to claim 1, wherein the second music piece is later in the playback order than the first music piece, and merging the multiple pieces of target recommendation music to obtain the at least one piece of merged music comprises:
extracting, starting from end, the first music segment of a first preset duration from the first music piece;
extracting, starting from beginning, the second music segment of a second preset duration from a latter one of the second music piece; and
merging the first music segment and the second music segment to obtain a corresponding one of the at least one merged music.

12. The method according to claim 1,
wherein a sum of a first weight value from the first weight sequence and a corresponding second weight value from the second weight sequence is 1.

13. A non-transitory computer-readable storage medium storing computer instructions causing a computer to execute the method according to claim 1.

14. A non-transitory computer program product comprising a computer program which, when executed by a computer, cause the computer to perform the method according to claim 1.

15. An electronic device, comprising:
at least one processor; and
a memory communicatively connected to the at least one processor; wherein,
the memory stores instructions executable by the at least one processor, and execution of the instructions by the at least one processor enables the at least one processor to:
obtain one or more physiological parameters of a target user collected by a wearable device;
process the one or more physiological parameters of the target user with a relaxation state assessment model to determine a current relaxation state of the target user;
determine at least one piece of target recommendation music based on at least one of the current relaxation state of the target user or relaxation parameters corresponding to multiple pieces of music to be recommended, wherein the at least one piece of target recommendation music comprises multiple pieces of target recommendation music including a first music piece and a second music piece, and the at least one piece of target recommendation music is configured to be played for the target user,
merge the multiple pieces of target recommendation music to obtain at least one piece of merged music, wherein the instructions further comprise instructions to:
merge respective sub-segments, of a first music segment extracted from the first music piece and a second music segment extracted from the second music piece, based on a first weight sequence corresponding to the first music segment and a second weight sequence corresponding to the second music segment, wherein the first weight sequence and the second weight sequence each contain multiple weight values, the first weight sequence gradually decreasing in value and the second weight sequence gradually increasing in value; and
determine a playback order of the multiple pieces of target recommendation music and the at least one piece of merged music, wherein the multiple pieces of target recommendation music and the at least one piece of merged music are played for the target user in sequence based on the playback order.

16. The electronic device according to claim 15, wherein the electronic device is the wearable device, a mobile terminal wirelessly communicating with the wearable device, or a remote server wirelessly communicating with the mobile terminal.

17. The electronic device according to claim 15, wherein the electronic device communicates wirelessly with the wearable device in a short range.

18. The electronic device according to claim 15, wherein the at least one process is further enabled to:

before determining the at least one piece of target recommendation music based on at least one of the current relaxation state of the target user or relaxation parameters corresponding to multiple pieces of music to be recommended:

obtain at least one of music preferences, attribute information, or historical sleep data of the target user;

determine a target music style corresponding to the target user based on at least one of the music preferences, attribute information, or historical sleep data of the target user; and determine multiple pieces of candidate music belonging to the target music style from a candidate music library as the multiple pieces of music to be recommended.

19. The electronic device according to claim 15, wherein the at least one process is further enabled to:

before determining the at least one piece of target recommendation music based on at least one of the current relaxation state of the target user or relaxation parameters corresponding to multiple pieces of music to be recommended:

obtain music features of multiple pieces of music to be recommended; and determine the relaxation parameters corresponding to the multiple pieces of music to be recommended with a relaxation parameter estimation model based on the music features of multiple pieces of music to be recommended and at least one of attribute information or historical music playback data of the target user.

* * * * *